United States Patent [19]

Kiste, Jr.

[11] 4,253,589

[45] Mar. 3, 1981

[54] MULTI-PURPOSE PLASTIC DISPENSER

[76] Inventor: James H. Kiste, Jr., 1122 Country Club La., P.O. Box 231, Ashland, Ohio 44805

[21] Appl. No.: 26,665

[22] Filed: Apr. 3, 1979

[51] Int. Cl.³ .............................................. G01F 11/00

[52] U.S. Cl. ............................... 222/390; 74/424.8 A

[58] Field of Search ................................ 222/390-392, 222/326, 327; 128/236; 239/324; 401/172; 85/1 L, 47, 32 V; 74/424.8 R

[56] References Cited

U.S. PATENT DOCUMENTS

| | | | |
|---|---|---|---|
| 2,421,711 | 6/1947 | Moots et al. | 222/327 |
| 3,250,443 | 5/1966 | Abbott | 222/327 |
| 3,842,877 | 10/1974 | Andrews | 85/1 L |

FOREIGN PATENT DOCUMENTS

| | | | |
|---|---|---|---|
| 4718 | of 1912 | United Kingdom | 222/390 |
| 8294 | of 1913 | United Kingdom | 222/390 |

*Primary Examiner*—H. Grant Skaggs

*Attorney, Agent, or Firm*—Oldham, Oldham, Hudak & Weber

[57] ABSTRACT

The plastic dispenser is of the nature of a caulking gun and it includes a frame having two end members for receiving a caulking cylinder or similar unit therein, a drive screw operatively engaging with one of the end members, and a handle member secured to the drive screw at a portion thereof externally of the frame. This screw has two longitudinally spaced sections of reduced areas, and the engagement between the screw and one end member is such as to permit this screw to be released from or engaged with the one end member when either longitudinal section of reduced thickness is operatively associated therewith to facilitate rapid axial movement of the screw when desired.

3 Claims, 3 Drawing Figures

MULTI-PURPOSE PLASTIC DISPENSER

BACKGROUND OF THE INVENTION

Heretofore there have been many, many different types of caulking guns and other similar dispensers provided and made and sold commercially in large quantities for dispensing grease, sealing materials, caulking material, etc. These guns are usually adapted to receive a conventional caulking or grease cylinder, etc. therein and to apply pressure in a controlled manner to the plastic to be expelled. Normally, a pressure piston or screw controlled plunger is provided in the gun or dispenser to force the contents of a caulking cylinder or grease container etc. therefrom.

Typical patents on metal caulking guns as made and sold in large quantities heretofore would include U.S. Pat. Nos. 2,720,345 and 2,801,775. These caulking guns have included some type of a ratchet and rack gear connection between a control piston rod and propelling lever mechanism. Some type of a control level is usually pivotally secured to a handle member or other frame unit to move the control piston rod forwardly by increments for expelling caulking material from an associated caulking cartridge.

It is desired to make a caulking gun wherein the cost thereof can be reduced and the weight and size of the gun can be also reduced. Furthermore, it is desirable to expel the contents of a caulking cylinder or the like gradually and continuously from the associated gun rather than by the propelling or extrusion by increments as provided by a ratchet type squeezing action or pressure exerted upon a caulking cartridge and its contents.

In view of the foregoing, it is the general object of the present invention to provide an improved plastic caulking gun of reduced weight and cost; a dispenser that is of a design that can be made from suitable plastic material; and to provide a dispenser wherein the contents of a caulking cartridge or similar member can be continuously uniformly expelled by a drive screw action.

Another object of the invention is to provide a multi-purpose dispenser, such as a caulking gun, as outlined hereinabove and wherein the caulking gun permits rapid retraction of the control or pressure screw of the caulking gun when it is desired to retract the control piston and adapt the gun for receipt of a filled caulking cartridge.

Yet another object of the invention is to simplify the construction of a caulking gun and to improve the ease of operation thereof, and to reduce the time required in use of caulking guns and the refilling of a caulking gun with a new cartridge.

Yet another object of the invention is to provide a relatively simple engagement between a caulking gun frame and a control or pressure drive screw in the caulking gun so as to permit the engagement and disengagement of this drive screw re the frame in an easily controlled rapid manner.

The foregoing and other objects and advantages of the present invention will be made more apparent as the invention proceeds.

Reference now is particularly made to the accompanying drawings, wherein.

When referring to corresponding members as shown in the drawings and referred to in the specification, corresponding numerals are used to correlate members shown in the drawings when referred to in the specification.

SUBJECT MATTER OF THE INVENTION

Figure 1:
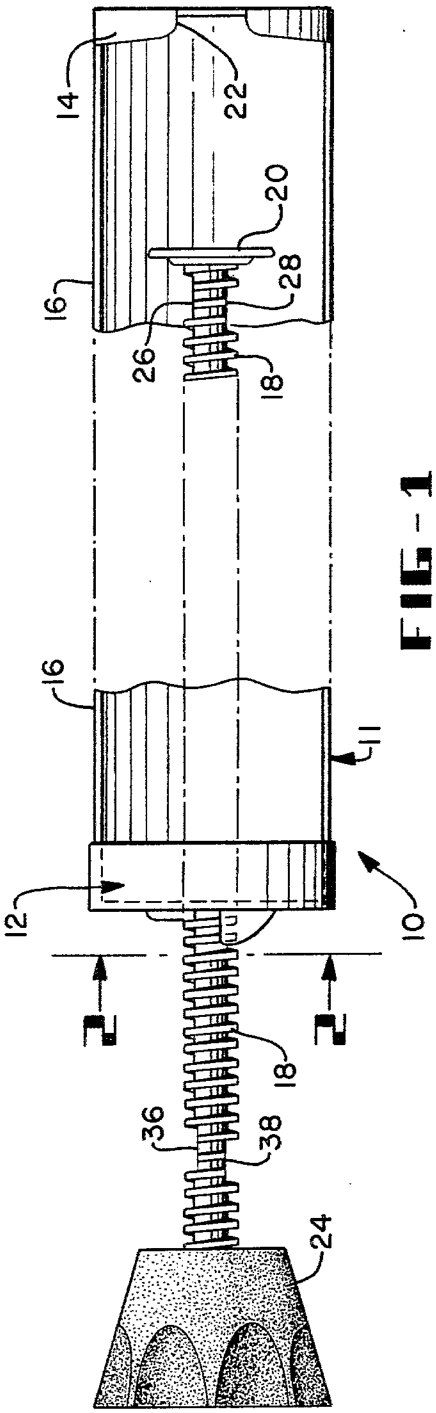
FIG. 1 is an elevational view of a caulking gun embodying the principles of the invention.
Figure 3:
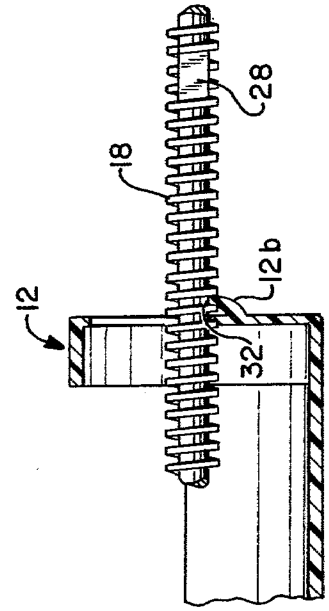
FIG. 3 is a plan view, partially shown in section, taken on line 3—3 of FIG. 1.
Figure 2:
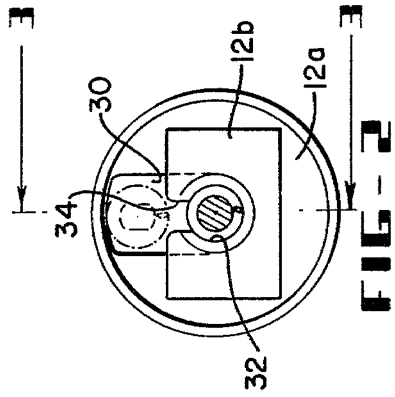
FIG. 2 is a vertical section taken on line 2—2 of FIG. 1, with the release position for the control screw being indicated in dotted lines.

The caulking gun includes, as one embodiment thereof, a cradle-like frame having two end members and a connecting means whereby the frame is adapted to receive a caulking cylinder therein, a drive screw having a pressure plate operatively connected thereto at one end thereof, and a handle means secured to the other end of the screw, one of the end members being adapted to threadably engage the screw, and wherein the caulking gun is characterized by the screw having two spaced longitudinal sections of reduced area so as to make the screw releasable from or engageable with the one end member when one of the longitudinal sections is associated therewith, which end member normally has a release slot formed therein connecting to a thread engaging aperture in the end member so as to permit lifting or moving the screw up out of engagement with the aperture and slot in the end member and permit rapid axial retraction or other movement of the drive screw when it is desired to remove one cartridge from the gun and place a new cartridge therein.

With reference to the details of the structure shown in the drawings, a dispenser and specifically a caulking gun, is indicated as a whole by the numeral 10. This gun 10 includes a frame 11 having end members 12 and 14 connected by a longitudinally extending section 16 having an open top whereby a more or less cradle-type frame 11 is provided. This longitudinally extending member can be of semi-tubular shape in section, or it can be a plurality of circumferentially spaced bars or straps or the like, as desired. The frame is made as a unit from plastic of any suitable size and strength, as desired.

A threaded drive screw 18 operably engages the one end member 12 and it has a pressure plate or disc 20 rotatably and operably secured to an inner end of the drive screw. This pressure plate 20 will engage an end disc or other equivalent means (not shown) on the conventional caulking cylinder for applying pressure to the cylinder for expelling the contents therefrom. These cylinders normally have extrusion or discharge spouts thereon which are operably engaged with the end member 14 as by being dropped or slid into the frame and having the discharge spout be received in a recess indicated at 22 in this end member 14 and extending to a margin thereof.

Any suitable handle member or device 24 operably engages an end of the drive screw 18 that extends from the end member 12 beyond the frame of the gun.

It is a feature of the present invention that the drive screw 18 is adapted for quick release from engagement with the end member 12 to permit axial retraction movement of the screw readily for removal of a spent cylinder and, normally, for receipt of a filled caulking gun cylinder in the apparatus for use therein. Thus, to achieve this purpose, the drive screw 18 normally has reduced cross sectional areas at two axially spaced portions thereof and this includes two flattened parallel sides 26 and 28 that are of reduced width so as to be removable from the portion of the end member 12 threadably engaging the screw. Normally, the end member 12 can be made of a cup-like member 12*a* of thin gauge, and then it is completed by a heavier plate or section 12*b* suitably formed integrally with the base portion of the cup shaped section 12*a* of the end member. Normally, the end member has a slot or opening 30 formed therein and extending down to and being aligned with a screw engaging aperture 32 formed in the plate 12*b*. This aperture has the edge wall thereof slightly curved out of flat planar shape whereby the edge of this aperture 32 is contoured complementary to the pitch of the threads on the drive screw 18 and with the plate 12*b* being of such thickness as to be received within the screw between a pair of adjacent threads thereon to control the position of the screw and the application of pressure to a caulking gun cartridge being used. However, when this screw is so positioned as to have the sides 26 and 28 received in the aperture 32, and with the sides being directed towards a release slot 34 formed in this plate in alignment with the slot 30 in the end cup 12*a*, then the screw can be moved radially of the end member and the screw is released from its threaded engagement with such end member 12. There is sufficient room or space in the upper portion of the slot 30 as to enable the screw to be moved axially without any restraint by the end member. Thus, the drive screw can be readily retracted from an extended position where the pressure plate 20 is adjacent the end member 14 for action in forcing caulking material from the gun to a retracted position.

The drive screw 18 also has another pair of opposed sides 36 and 38 adjacent the handle 24 whereby the drive screw can be operably engaged or disengaged from the end member 12 adjacent either end of the screw, since the one pair of parallel sides 36 and 38 are adjacent the handle, and the other pair of parallel sides 26 and 28 are adjacent the pressure plate.

The caulking gun can be used in any desired position, but when the drive screw is to be advanced or retracted, the gun preferably is positioned horizontally with the slot 34 and opening 30 extending vertically upwardly as shown.

The threads on the screw 18 are not fully removed at the reduced area portions 26 and 28, and 36 and 38—only at the opposed flat surfaces. Hence, by turning the screw 18 it can be manually advanced or retracted past the axially spaced reduced size portions as desired as gravity aids in retaining the screw and plate 12*b* in operative engagement.

The caulking gun of the invention is made from relatively few parts, but yet it will give a convenient hand operated controlled action. The gun is open for its length at its upper circumferential area to enable a conventional cartridge or cylindrical container for plastic material to be dispensed to be inserted into the cradle-like frame. The pressure plate 20 then can be moved axially to engage the end plate of the cylinder in a conventional manner to force material from the cartridge dispenser spout.

The dispenser or gun is light in weight, but yet sturdy and provides for rapid release of a caulking gun cartridge when spent and replacement with a new filled cartridge by convenient axial movement of the drive screw as outlined. Accordingly, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. A multi-purpose dispenser such as a caulking gun including a unitary molded plastic frame with two end members and a connecting means, which frame is adapted for receiving a caulking cylinder or the like therein, a drive screw with a pressure plate operatively connected thereto at one end, and a handle means secured to the other end of said screw, one of said end members threadedly engaging said screw and said caulking gun being characterized by said screw having two longitudinally spaced sections of reduced area to make said screw releasable from said one end member when said screw is operatively engaged therewith and is moved to bring one of said sections into a preestablished release association with said one end member, said one end member having an opening therein in an upper portion thereof connected to a thread engaging aperture therein by a release slot, said thread engaging aperture engaging said screw and retaining it in said aperture, said screw being of reduced width at said longitudinal sections thereof, said release slot being sized to pass said one longitudinal section therethrough when said reduced width is aligned with said release slot, said drive screw having a thread thereon extending from said handle means and to said pressure plate and being engaged with said thread engaging aperture to be only axially movable for a major portion of its length.

2. A dispenser as in claim 1 where said frame is of a cradle-like shape that is open over a circumferential arc to enable a caulking cylinder to be moved into seating engagement with said frame.

3. A caulking gun including a cradle-type frame with two end members and a connecting means which frame is adapted for receiving a caulking cylinder, a threaded drive screw with a pressure plate rotatably and operatively connected thereto at one end, said drive screw having its other end protrude from said frame, said pressure plate being adapted to engage a caulking cylinder closure for moving same longitudinally of the cylinder to expel its contents, and a handle means on the other end of said screw which end is positioned externally of said frame, one of said end members threadedly engaging said screw and retaining said screw in engagement therewith, and said screw having two longitudinal sections of reduced area to make said screw releasable from said one end member when engaged therewith and either of said longitudinal sections is moved into association with said one end member, said one end member being of a thickness as to operatively engage the thread of said screw, said one end member having a hole therein, said one end member has a screw release opening formed therein connecting to said hole by a release slot, said screw having two flat parallel sides at said longitudinal sections capable of passing through said release slot which will not pass other portions of said screw, said drive screw having a thread thereon extending from said handle means to said pressure plate and being engaged with said thread engaging aperture to be only axially movable for a major portion of its length, but being releasable from said one end member hole by movement radially away from its axis when said screw parallel sides and said release slot are in alignment.

* * * * *